T. BREHENY.
CONDENSING APPARATUS.
APPLICATION FILED OCT. 20, 1914.

1,202,662.

Patented Oct. 24, 1916.
3 SHEETS—SHEET 2.

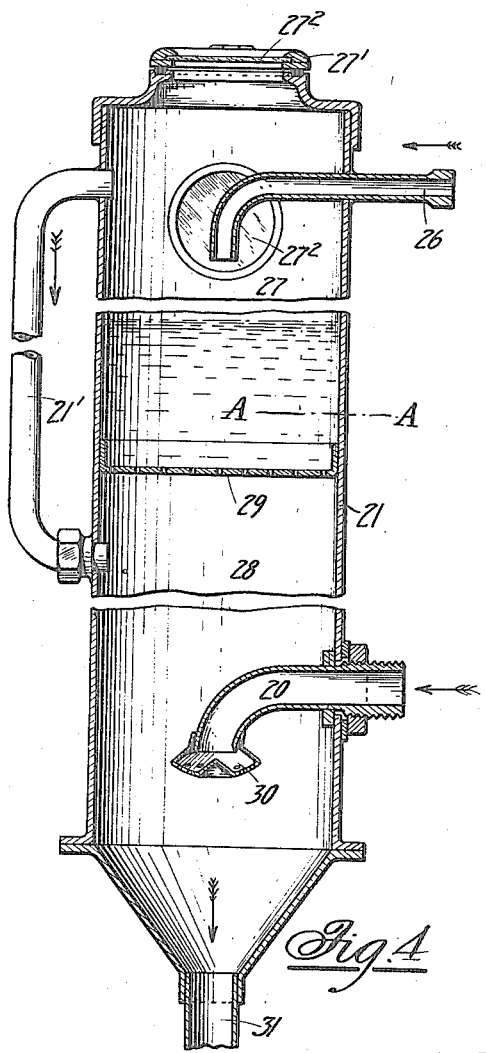
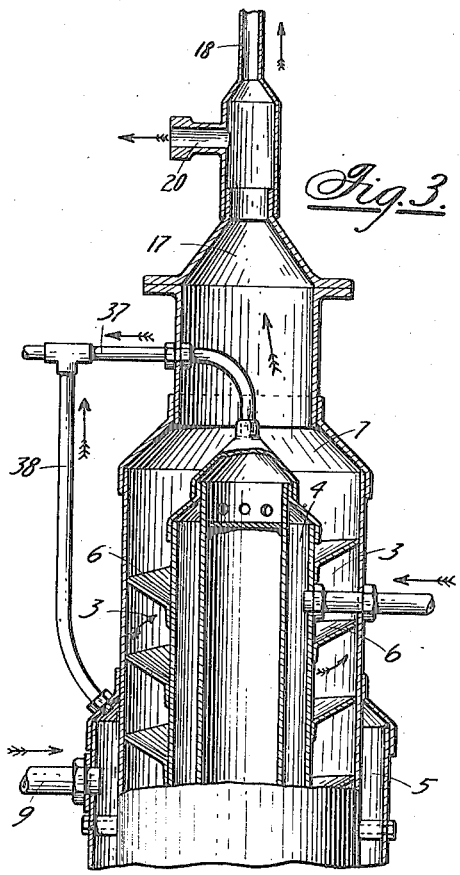
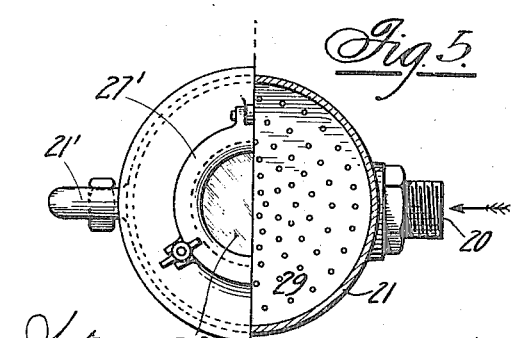
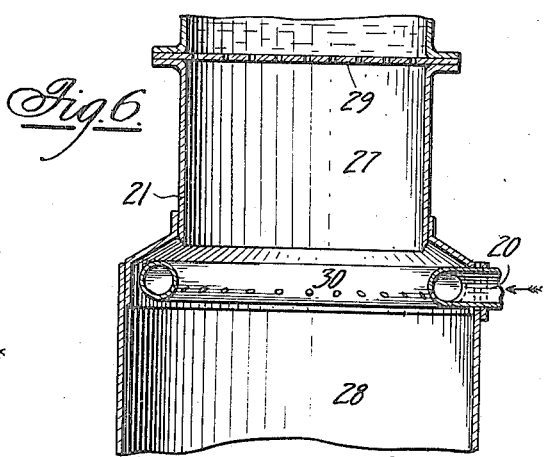

UNITED STATES PATENT OFFICE.

THOMAS BREHENY, OF MELBOURNE, VICTORIA, AUSTRALIA.

CONDENSING APPARATUS.

1,202,662.　　　　　Specification of Letters Patent.　　Patented Oct. 24, 1916.

Application filed October 20, 1914.　Serial No. 867,685.

*To all whom it may concern:*

Be it known that I, THOMAS BREHENY, of Melbourne, in the State of Victoria, Commonwealth of Australia, have invented certain new and useful Improvements in Condensing Apparatus, of which the following is a specification.

This invention relates to an apparatus for preserving the volatile hop essences or aromas coming from the copper or boiler in which the wort is boiled with the hops in order to improve the quality of the beer and like brews.

The method and apparatus comprised in the present invention consists in arranging a specially constructed condenser in communication with the top of a copper whereby the vapor arising from the heated contents of the latter will pass to and be condensed in the former.

The condensed vapor or steam is delivered to a supplementary cooling coil and thence to a mixing chamber where it is brought into contact with the non-condensable or practically non-condensable odoriferous gases or fumes which pass from the upper end of the condenser and are collected and delivered to the said chamber in a convenient way.

The liquid resulting from the condensation of the steam or vapor given off from the copper absorbs the aroma of the odoriferous gases or fumes in the mixing chamber and as a result is richer in flavor and aroma than the original liquid contents of the said copper. The liquid is conveyed from the mixing chamber to an open vessel or chamber from which it is delivered to a fermenting vat.

The invention is exceedingly simple, reliable and comparatively economical to install and keep running and every provision is made for cleansing the apparatus when required.

In order that the invention may be readily understood reference will now be had to the accompanying sheets of explanatory drawings wherein:—

Figure 1:
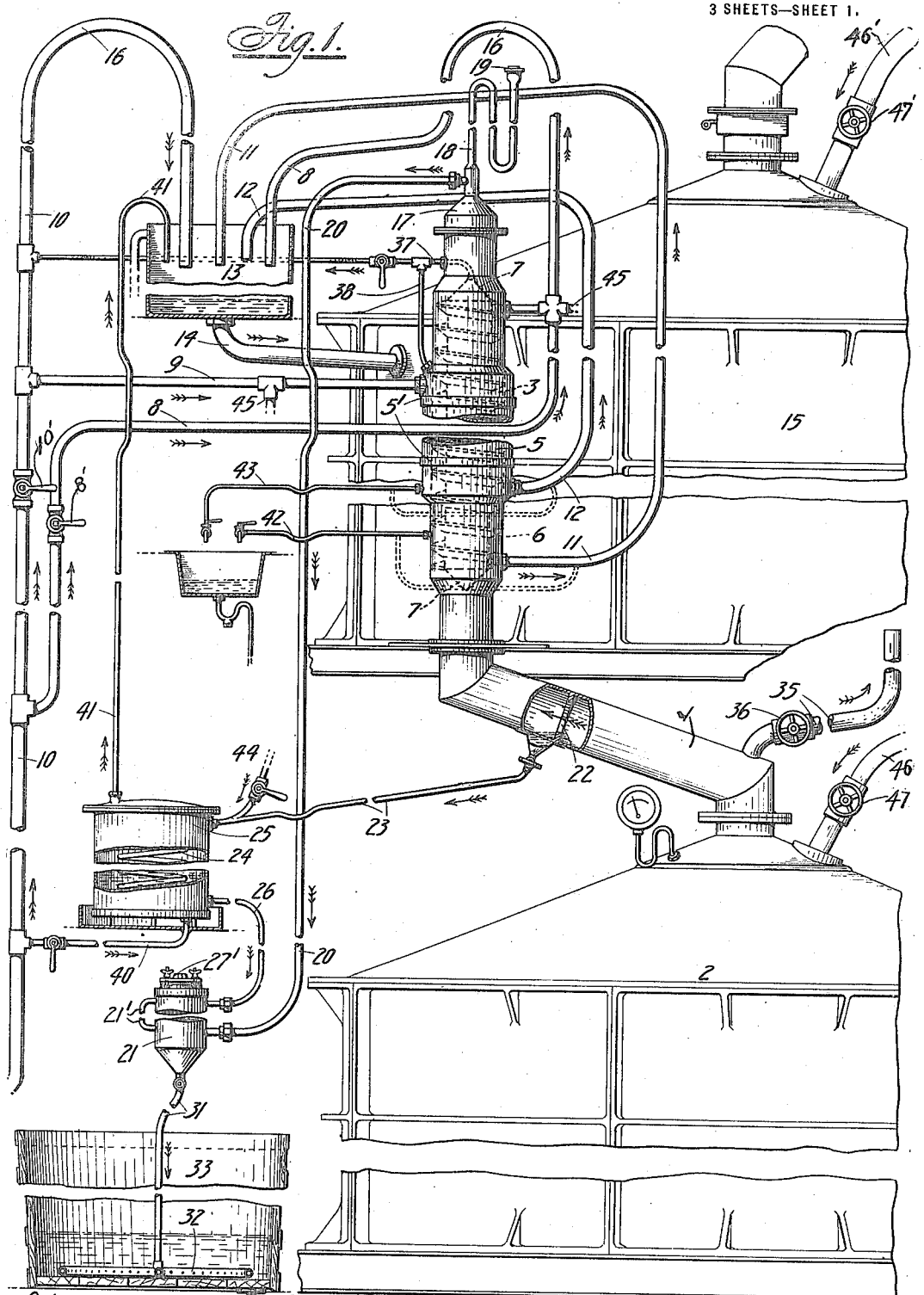
Figure 2:
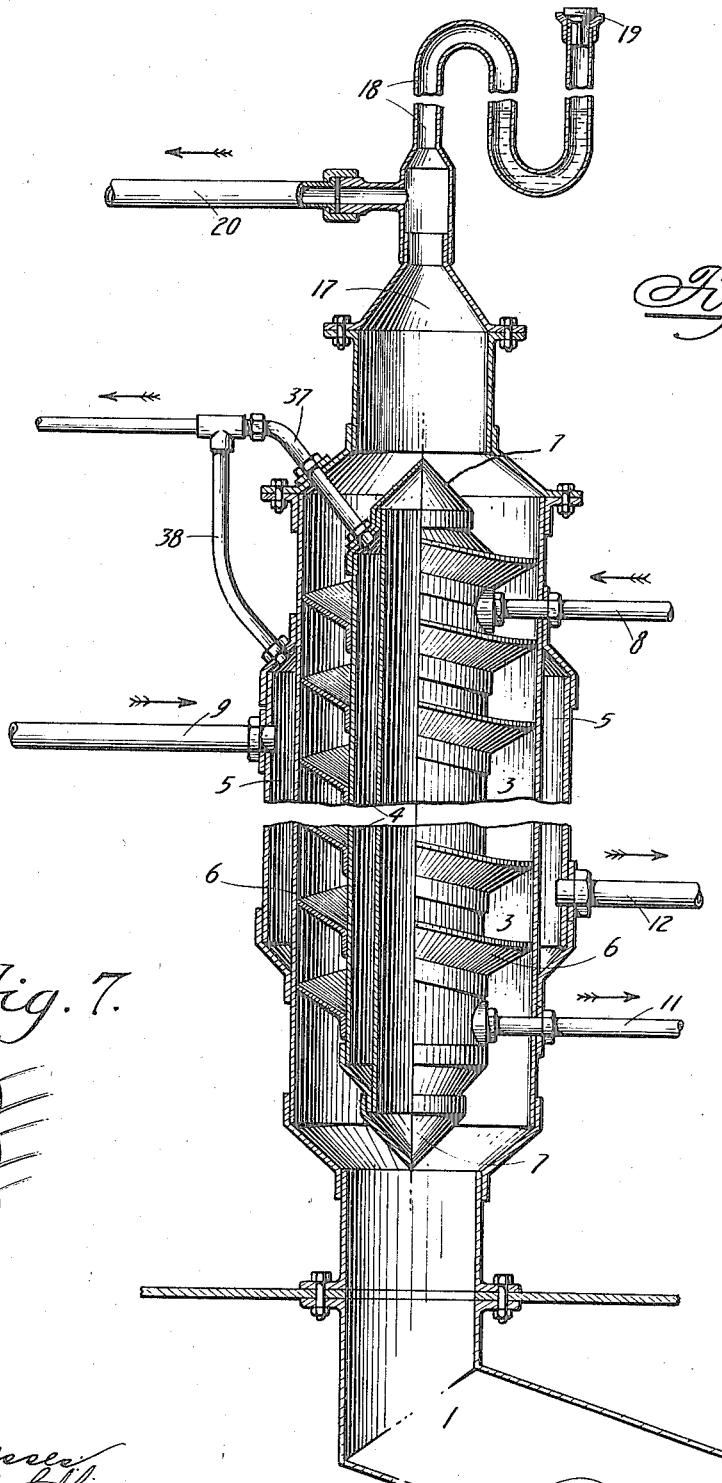
Figure 7:
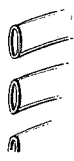

Figure 1 is a view in elevation of the apparatus comprised in the present invention the various parts being arranged to show their approximate relative positions. Fig. 2 is a view in sectional elevation of a condenser forming part of the apparatus. Fig. 3 is a view in sectional elevation of part of a modified form of condenser. Fig. 4 is a view in sectional elevation of the mixing chamber. Fig. 5 is a view in plan (partly in section) of Fig. 4 taken on the dotted line A—A. Fig. 6 is a view in sectional elevation of part of a modified form of mixing chamber. Fig. 7 shows a modified form of the cooling coil.

In these drawings like characters of reference have been employed to indicate similar or corresponding parts in the different views and the numeral 1 designates a flue which has its lower end connected to the center of the top of a copper 2 and its upper end arranged in communication with a circuitous passage 3 or circuitous passages formed between two concentrically disposed annular water jackets 4 and 5 forming a condenser of any well known type and construction.

The outer water jacket 5 is strengthened by bands $5^1$ or in any other preferred way. The water jackets 4 and 5 are kept at as uniform a degree of coldness as possible by passing cold water continuously therethrough from branch pipes 8 and 9 respectively connected to a main supply pipe 10. The water passes through the jackets 4 and 5 and is heated more or less therein and then passes to discharge pipes 11 and 12 connected to the lower ends of the said jackets.

The delivery end of the discharge pipes 11 and 12 preferably open into a sump 13 or the like which is connected by a pipe 14 to a liquor or hot water vat 15 arranged above the copper 2 in the ordinary way. The main water supply pipe 10 and the branch pipe 8 are carried vertically upward beyond and are then given bends 16 which will cause their open ends to lie within the sump 13. The main supply pipe 10 and the branch pipe 8 are fitted with cocks $10^1$ and $8^1$ which can be regulated to permit just sufficient flow to accommodate the pipes 8 and 9. The water is delivered to the pipe 10 under pressure and normally rises above the junction of the pipes 8 and 9 and should the pressure increase in the pipe above the cock $10^1$ the water will flow out the end of the said pipe into the sump 13 and thereby automatically keep the pressure and consequently the flow in the said pipes 8 and 9 approximately uniform.

The upper end of the outer water jacket 5 is covered by a cap or hood 17 from the center of which a pipe 18 projects vertically. This pipe 18 is bent downwardly and upwardly and its upper end is provided with a relief valve 19 of approved form. The second bend in the pipe normally contains water to form a seal to prevent the escape of the non-condensable gases passing through the condenser from the copper. Normally, the water in the pipe 18 prevents the escape of steam or vapor but should the pressure within the condenser become excessive the water will be forced upwardly thereby raising the valve 19 and permitting the water and sufficient steam to escape to relieve the said pressure. If preferred, the pipe 18 can be dispensed with and a relief valve similar to 19 can be fitted to the cap or hood 17 in an approved way.

The non-condensable gases which are rich in aroma pass together with any vapor not condensed in the passage 3 along a pipe 20 leading from the cap or hood 17 covering the upper end of the condenser, to the mixing chamber 21 into which the condensed vapor or steam also is delivered. The liquid resulting from the condensation of the vapor or steam in the condenser trickles back through the passage 3 therein and along the flue 1 to a point where it is trapped by a ring partition 22 or the like in said flue. The trapped liquid passes into a pipe 23 leading to the upper end of a cooling coil 24 located in a water tank 25 disposed in any convenient position.

The cooling coil is formed of a flat pipe or tube as shown in Fig. 7 and its lower end is connected to a pipe 26 leading to the mixing chamber 21 hereinbefore mentioned. The mixing chamber 21 is divided into two compartments 27 and 28 and into the upper compartment 27 is delivered the condensed steam or vapor and into the lower compartment 28 is delivered the vapor and (or) gases not condensed in the condenser.

The partition 29 dividing the mixing chamber 21 into the two compartments 27 and 28 is perforated and the liquid delivered to the top compartment passes to the lower compartment in a fine spray. The end of the pipe 20 delivering the non-condensable gases into the lower compartment 28 of the mixing chamber 21 is provided with a spray 30 for distributing or spreading the said gases evenly to insure them intermingling with the whole of and the aroma of the same being absorbed by the liquid showered from the upper compartment 27.

An overflow pipe $21^1$ is located on the side of the mixing chamber 21 to permit of the liquid delivered to the upper compartment passing to the lower compartment when it rises to a predetermined height therein. The top of the mixing chamber is provided with a hinged or detachable cover $27^1$ and glasses $27^2$ can be arranged in any preferred way that will permit of a ready inspection of the upper compartment 27. The liquid delivered to the lower compartment 28 of the mixing chamber 21 passes therefrom through a pipe 31 leading to a perforated pipe 32 located in or near the bottom of an open vat or chamber 33 disposed in any convenient position.

Should any of the aroma of the non-condensable gases not be absorbed by the liquid in the mixing chamber 21 the absorption will take place in the open chamber 33. The liquid delivered to the open chamber 33 is allowed to pass through a pipe 34 to a fermenting vat or the like (not shown). The copper 2 is provided with a relief pipe 35 fitted with a controlling cock 36 and the upper ends of the water jackets 4 and 5 are provided with air outlet pipes 37 and 38 which preferably communicate with the main water supply pipe 10. The air pipes 37 and 38 connected to the upper ends of the water jackets 4 and 5 permit of the escape of air when water is being delivered thereto prior to the commencement of operations. The object of the relief pipe 35 is to permit of the introduction of air to the copper 2 at the completion of operations to break down the vacuum caused by the condensation of steam therein and thereby permit of the top 39 of the said copper being easily opened.

A pipe 40 connects the lower part of the water tank 25 to the supply pipe 10 and a continual circulation of cold water is maintained in the said tank to cool the coil 24 and as the water in the tank becomes heated it passes therefrom through a pipe 41 which delivers into the sump 13 arranged in communication with the liquor vat 15. Provision such as test pipes 42 and 43 is made for readily determining the temperature of the water in the water jackets and for enabling them to be kept at as uniform a temperature as possible and provision such as priming pipes 44 is made also for insuring the liquid and vapor passing freely through all the pipes of the apparatus. The pipes 42 and 43 can be connected directly to the jackets 4 and 5 or to the discharge pipes 11 and 12 leading therefrom. These pipes 42 and 43 are provided with taps $42^1$ and $43^1$ which when turned on permit of water from the jackets being delivered to a sump $43^{11}$ for testing purposes. Should the water in the jackets be found to be of uneven temperature the cocks $10^1$ or $10^{11}$ can be operated to cause a greater or lesser flow of water to their respective jackets and thereby effect a uniform cooling.

The various parts of the apparatus are provided with connections or pipes 45 which permit of the attachment of a hose or pipe for delivering steam thereto for cleansing purposes.

It will be readily understood that the condenser, cooling coil, mixing chamber and the open chamber 33 must be arranged so that the condensed liquor will gravitate from one to the other in the manner hereinbefore described and that the connecting pipes can be arranged in any convenient or approved way. The contents of the copper 2 and hot water vat 15 are heated by steam which is delivered thereto through pipes 46 fitted with cocks 47, and 46¹ and 47¹ respectively.

Under normal working conditions the apparatus prevents the escape of vapor or odoriferous gases to the atmosphere and conveys the same in a liquid state to the fermenting vat to improve and enrich the brew. The use of the apparatus results in effecting considerable economy in the manufacture of beer and similar beverages as it prevents waste and requires much less fuel than is used with the ordinary brewing plant.

While I have briefly described in the foregoing specification the construction and operations preferred I am aware that numerous changes of construction may be made without departing from the spirit and scope of the invention, and I, therefore, do not wish to be understood as limiting myself by the positive terms employed in connection with the description excepting such as the state of the art may require.

What I do claim is:—

1. In a brewing apparatus of the character described, in combination, a condenser, a flue communicating with said condenser, a trap in said flue, a cooling coil, a pipe connecting said trap with said cooling coil, a mixing chamber in communication with said cooling coil, and a pipe connecting the top of the condenser to said mixing chamber, substantially as described and for the purpose set forth.

2. In a brewing apparatus of the character described for condensing vapors and absorbing gases and fumes, in combination, a condenser, a flue in communication with said condenser, a trap in said flue, a cooling coil, a pipe connecting said trap with said cooling coil, a mixing chamber in communication with said cooling coil, a pipe connecting the top of the condenser to said mixing chamber, an open chamber, and a pipe leading from said mixing chamber to said open chamber, substantially as described and for the purpose set forth.

3. In a brewing apparatus of the character described, in combination, a condenser, a flue communicating with said condenser, a trap in said flue, a mixing chamber, a horizontal perforated partition in said mixing chamber, a pipe connecting the upper end of said condenser to the mixing chamber below said partition, and a pipe connecting the upper part of the mixing chamber to said trap in the flue, substantially as described and for the purpose set forth.

4. In a brewing apparatus of the character described, in combination, a condenser, a flue communicating with said condenser, a trap in said flue, a mixing chamber, a horizontal perforated partition in said mixing chamber, a pipe connecting the upper end of said condenser to the mixing chamber below said partition, a spray in the lower part of the mixing chamber connected to the pipe leading to the top of said condenser, and an overflow pipe leading from the upper to the lower part of said mixing chamber, substantially as described and for the purpose set forth.

5. In a brewing apparatus of the character described, in combination, a condenser, a flue communicating with said condenser, a closed mixing chamber, a pipe passing from the upper end of said condenser to said closed mixing chamber, a trap in said flue, a cooling coil, a pipe connecting said cooling coil and said flue, a water tank surrounding said cooling coil, a pipe connecting said coil and said mixing chamber, an open chamber, a spray in said open chamber, a pipe passing from the lower end of said mixing chamber to said spray, or perforated pipe located in said open chamber or vat, substantially as described and for the purpose set forth.

In testimony whereof I affix my signature in presence of two witnesses.

THOMAS BREHENY.

Witnesses:
  JAMES H. ANDERSON,
  WILLIAM A. ASHLOW.